March 25, 1958  R. A. PEARSON ET AL  2,827,838
BOX SETTING UP MACHINE

Filed Nov. 8, 1954

INVENTOR.
Reinhold A. Pearson
BY Benny Weremiczyk

Truk Wells
Atty.

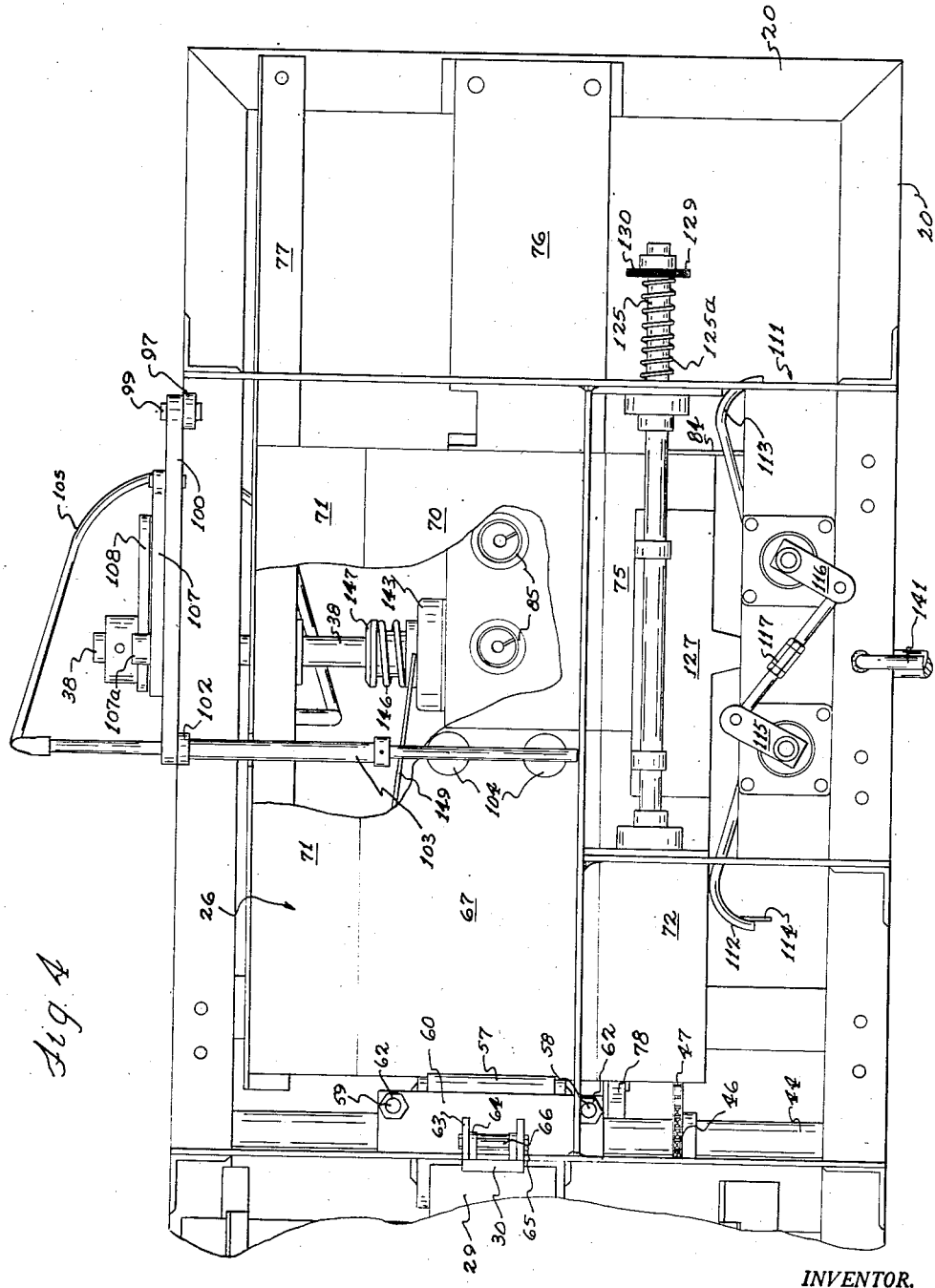

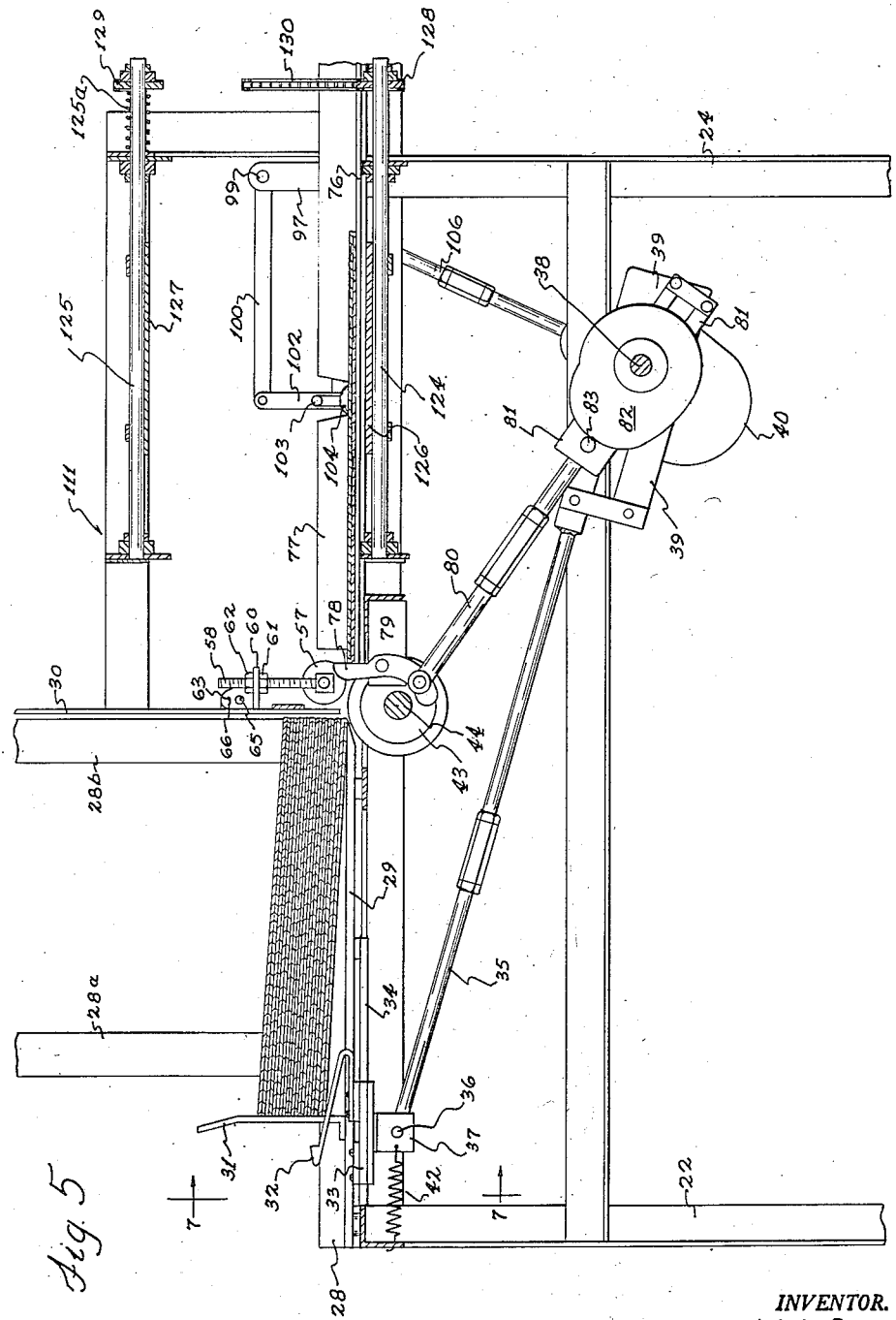

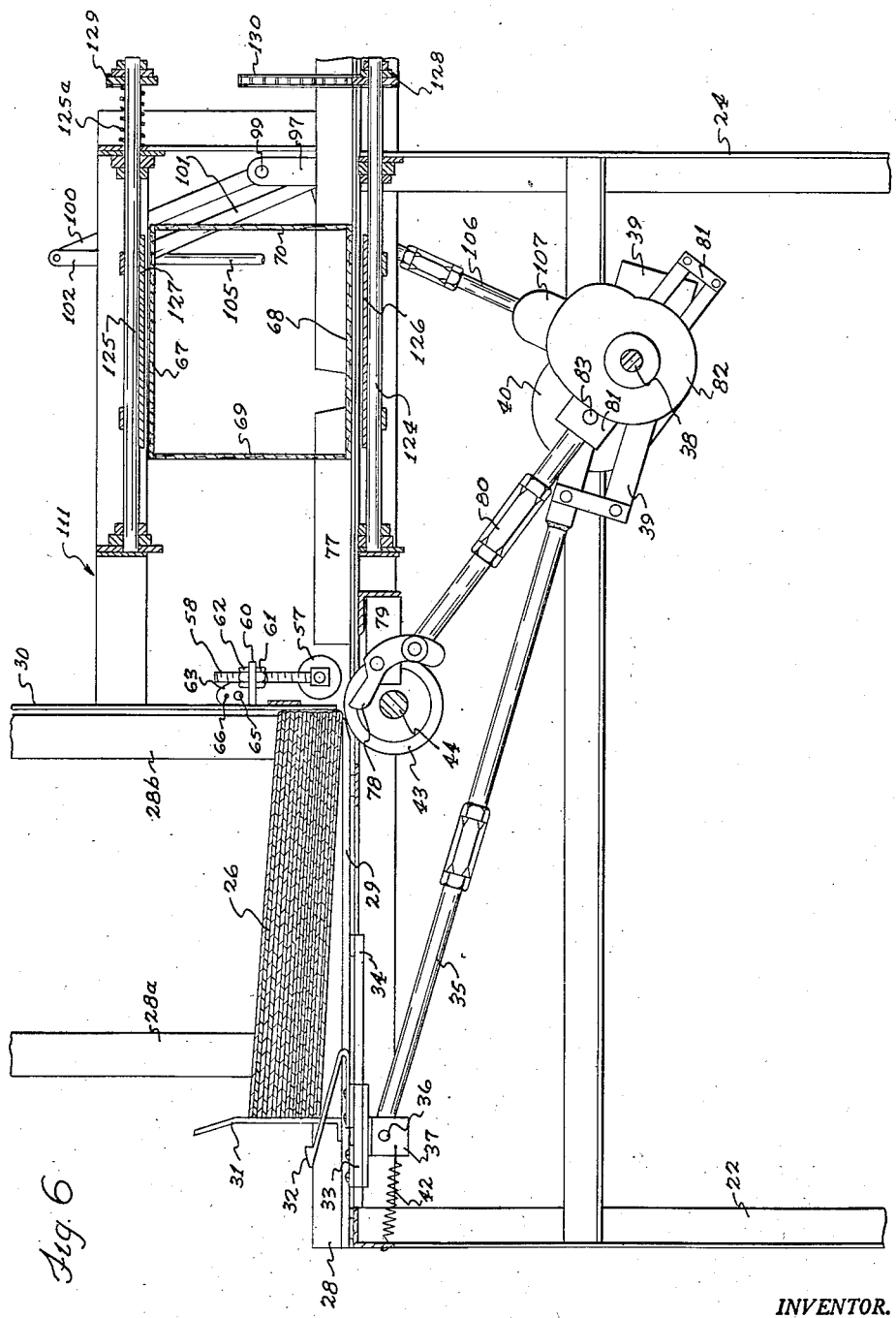

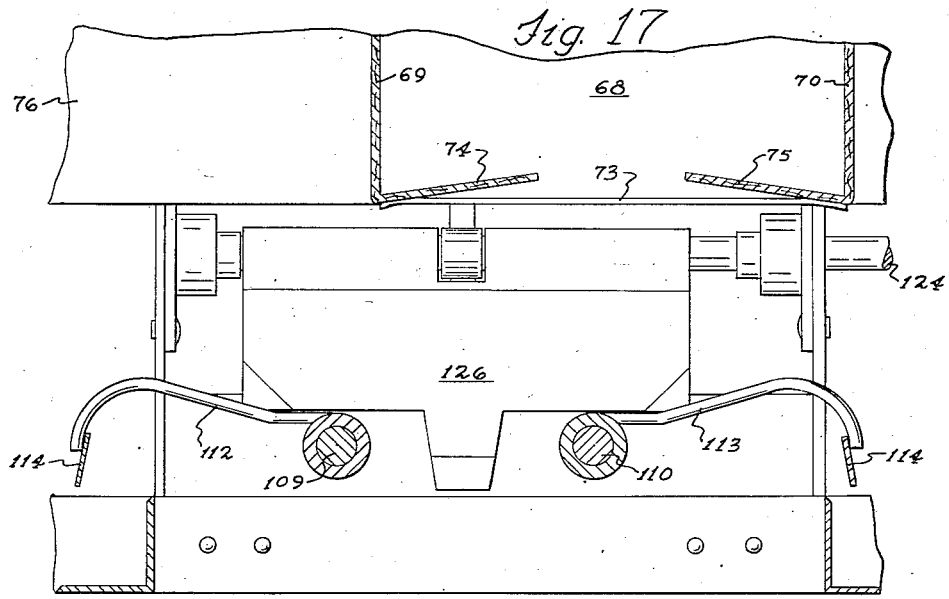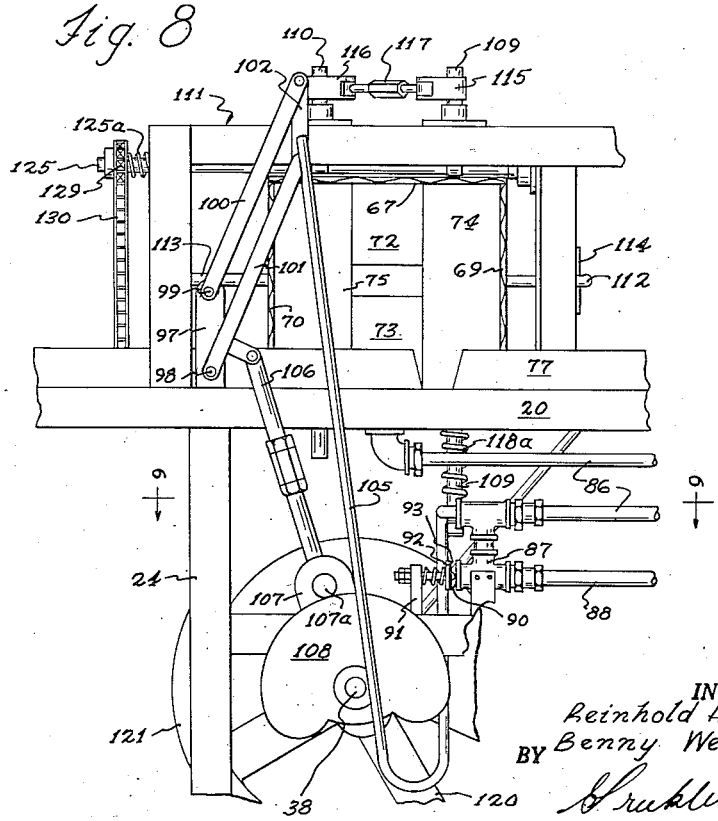

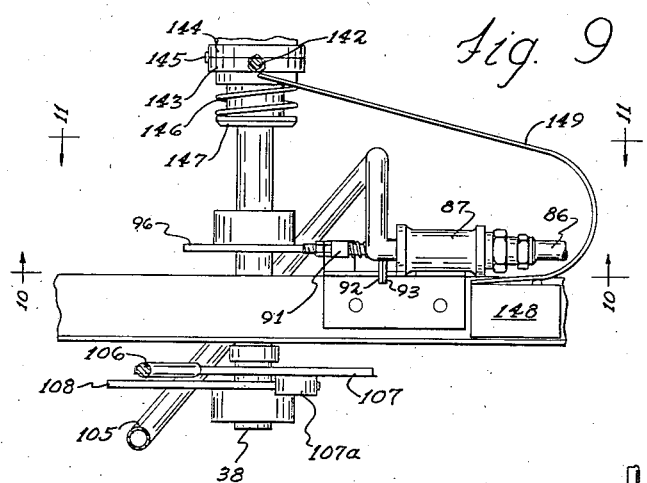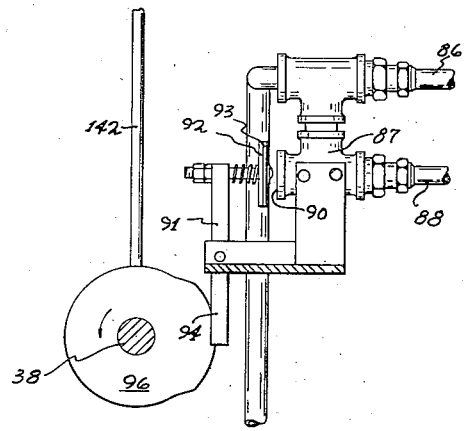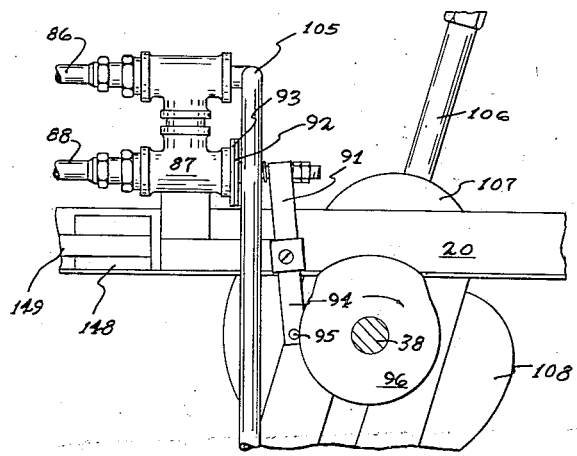

March 25, 1958 R. A. PEARSON ET AL 2,827,838
BOX SETTING UP MACHINE.
Filed Nov. 8, 1954 10 Sheets-Sheet 9
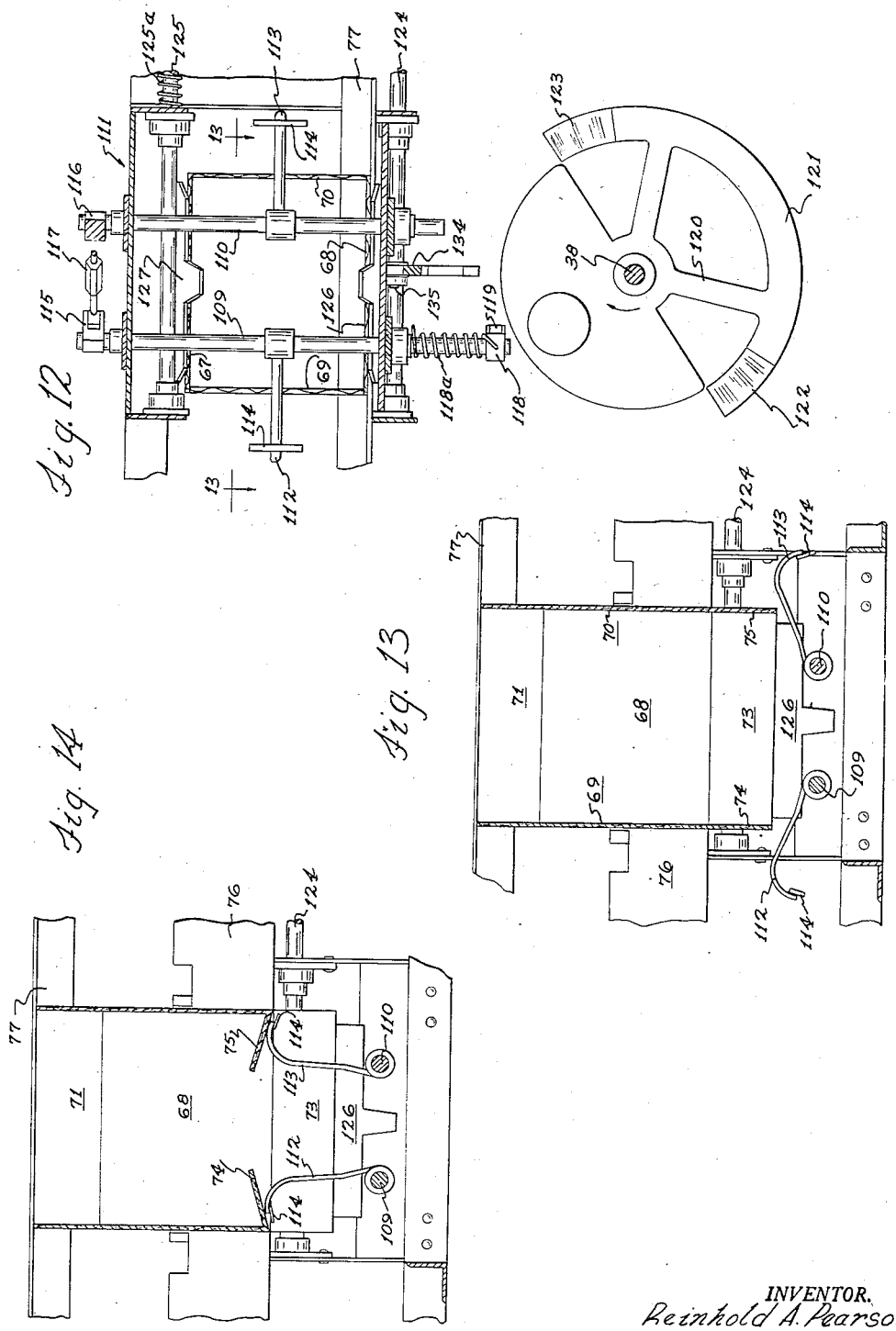
INVENTOR.
Reinhold A. Pearson
BY Benny Weremiczyk
Atty.

INVENTOR.
Reinhold A. Pearson
Benny Weremiczyk
BY
Atty.

United States Patent Office 2,827,838
Patented Mar. 25, 1958

2,827,838

BOX SETTING UP MACHINE

Reinhold A. Pearson and Benny Weremiczyk, Spokane, Wash.

Application November 8, 1954, Serial No. 467,356

6 Claims. (Cl. 93—36.8)

The present invention relates to improvements in a box setting up machine.

Cardboard boxes or cartons are in wide usage currently for packaging a wide variety of canned and bottled goods. Usually one or two dozen cans are packed in a box for transportation from the factory to the retail merchant. The canning factories are equipped with automatic machines to load the goods in the boxes and seal the top and bottom flaps thereof in place. The boxes are supplied in the factories in a flat or knocknown condition. The four sides are permanently secured together and each side has a top and a bottom flap thereon which are extended outwardly from the side. The boxes are supplied to the factories in this condition to conserve on shipping space. In order to ready the boxes for loading, it is necessary to open the boxes by moving the sides apart until the adjacent sides are at right angles, and then bend in the inside and outside bottom flaps to close the bottom. However, there is not at the present time, a machine that will accomplish the automatically, and many man-hours are spent in setting up the boxes by hand.

It is the principal purpose of the present invention to provide a machine which will take the flat or knockdown boxes from a stack, one at a time, grasp two opposite sides and lift one away from the other, fold in the inside and outside bottom flaps, and then eject the box.

A further purpose of the invention is to provide such a machine which will fold the outside bottom flaps inward in such a manner that these flaps will stay substantially in place until the box is loaded.

A still further purpose of the invention is to provide such a machine that will operate automatically, feeding a new box when the previous box is set up, and which will shut itself off when the machinery becomes clogged.

My machine comprises a table like frame which supports the various members that manipulate the box. At the feed end, a feed finger selects the bottom box of the feed stack and pushes it into the box opening and flap folding section. At this point, suction cups set into the frame, grasp the bottom side of the flattened box and hold it firmly. Upper moving suction cups swing down, grasp the opposite side of the box, and lift it up until the box is squared in its open position. When this has been accomplished, horizontally extending arms move inwardly, folding the inside bottom flaps into the bottom opening of the box and hold them there. Plates or wings pivoted on horizontal axes then swing up from the bottom and down from the top to fold the outside flaps in. The outside flaps are folded inwardly beyond their closed position, so that when they are released, they will not come entirely open again. The outside flap wings then return to their open position and a lever ejects the box. While the box is being ejected, the inside flap arms move outwardly, releasing those flaps and guiding the box to the delivery end of the machine.

The feed mechanism, box opening mechanism, flap closing mechanism, and ejecting mechanism are cam operated, all of their cams being mounted on a single shaft which is driven by an electric motor mounted on the frame.

The nature and advantages of my invention will appear more fully from the following description and the accompanying drawings wherein a preferred form of the invention is shown. The drawings and description are illustrative only, however, and are not intended to limit the invention except insofar as it is limited by the claims.

In the drawings:

Figure 4 is an enlarged partial plan view of the machine;

Figure 5 is an enlarged sectional view taken substantially on the line 5—5 of Figure 3 with parts left out, illustrating a flat box being positioned for opening;

Figure 6 is a view similar to Figure 5 except showing the box opened;

Figure 7 is an enlarged fragmentary sectional view taken on the line 7—7 of Figure 5;

Figure 8 is a fragmentary view of the machine illustrating the box opening mechanism;

Figure 9 is an enlarged fragmentary sectional view taken on the line 9—9 of Figure 8;

Figure 10 is a fragmentary sectional view taken on the line 10—10 of Figure 9;

Figure 11 is a fragmentary sectional view taken on the line 11—11 of Figure 9;

Figure 12 is an enlarged fragmentary sectional view taken on the line 12—12 of Figure 3;

Figure 13 is a fragmentary sectional view taken on the line 13—13 of Figure 12, showing the inside flap folding arms as they begin to pivot inward;

Figure 14 is a view similar to Figure 13, but showing the inside flaps folded in;

Figure 15 is an enlarged view similar to Figure 13, but showing the outside flaps folded in;

Figure 16 is a sectional view taken on the line 16—16 of Figure 15, and illustrating the corners of the outside flaps being bent out as the flaps are folded in; and Figure 17 is a view similar to Figure 15, but showing the completed box moving out of the machine.

Figure 1:
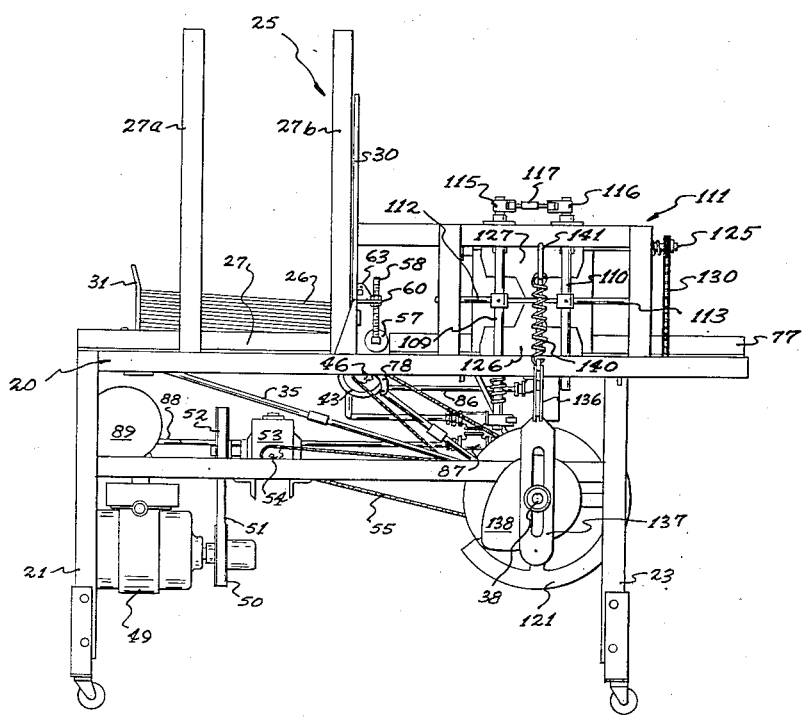
Figure 1 is a view in side elevation of my machine, looking at the right hand or flap closing side thereof.
Figure 2:
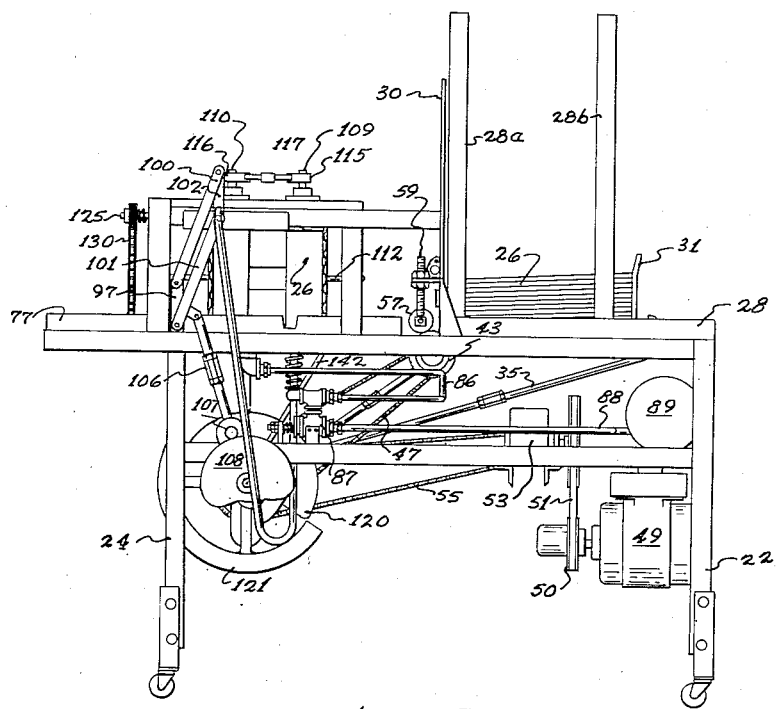
Figure 2 is a view in side elevation of my machine looking at the left hand or box opening side thereof.
Figure 3:
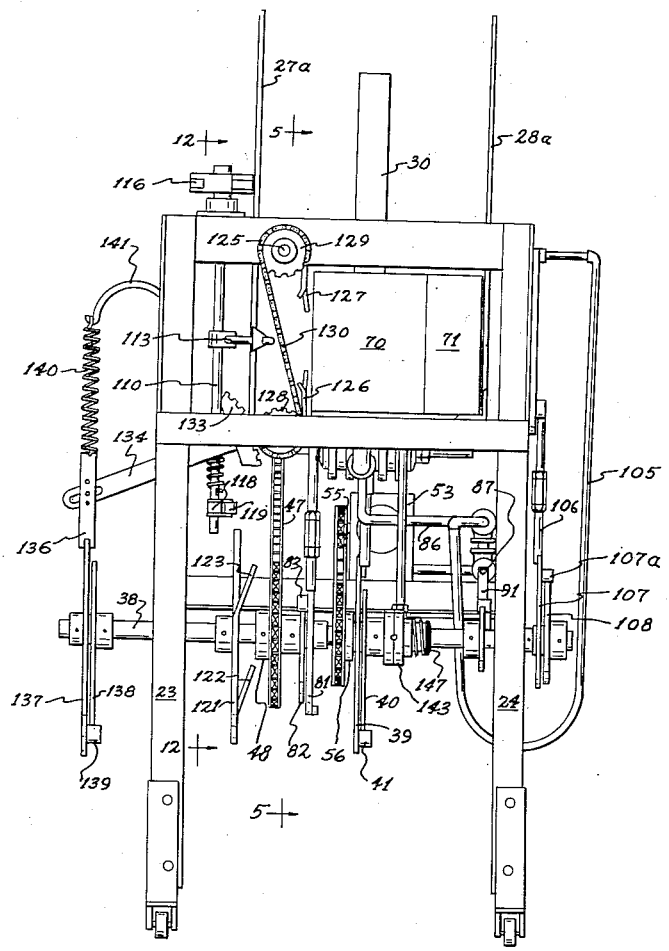
Figure 3 is an enlarged end view of the machine, looking at the delivery end thereof.

Referring now to the drawings, and to Figures 1, 2, and 3 in particular, my machine is shown as comprising a main, table like frame 20, which has four supporting legs 21, 22, 23 and 24. The main frame 20 supports at one end thereof a feed rack generally indicated at 25, in which the flattened boxes 26 are stacked for delivery into the machine. The boxes 26 are supported in the rack 25 by two parallel guide members 27 and 28 which rest on the main frame 20 at each side. A center guide 29 (best shown in Figures 5, 6 and 7) is also provided on the frame 20 to support the stack of flattened boxes 26. The guide members 27 and 28 have upright members 27a and 27b and 28a and 28b attached thereto to support the stack of boxes 26. Additional front and rear uprights 30 and 31 are provided to complete the rack 25.

The flattened boxes 26 are fed from the bottom of the stack in the feed rack 25 into the setting up section of the machine. In order to accomplish this, box feeding fingers 32 are provided. The fingers 32 are positioned at each side of the guide 29 and are mounted on a slide 33. The slide 33 is supported for endwise movement on a guide bar 34 which is supported on the underside of the guide 29. The guide bar 34 is of such a length that the slide 33 and fingers 32 carried thereon, can move from a position behind the stack of boxes, forwardly to a position beneath the stack.

To move the fingers 32 forward and feed a box 26 into the setting up portion of the machine, the slide 33 is provided with an actuating arm 35. The arm 35 is pivoted by a pin 36 between two legs 37 which depend from the slide 33. The actuating arm 35 extends forwardly beneath the rack 25 to a main operating shaft 38 which is rotatably supported by the frame 20 near the delivery end thereof. The drive means for the shaft 38 will be described later herein. A slotted guide member 39 which is fixed to the end of the arm 35, receives the shaft 38 and supports the arm for oscillatory movement thereon. A box starting cam 40 is fixed to the shaft adjacent the guide 39. A cam follower 41 on the end of the guide 39 opposite the arm 35 rides on the cam 40. The cam 40 is so shaped that at the start of each cycle, there being one cycle per revolution of the shaft 38, it causes the actuating arm 35 to be moved forwardly, moving the fingers 32 against the bottommost box 26 in the rack 25, causing it to be moved forward from under the stack. The front upright 30 terminates a short distance above the bottom guide 29 of the rack 25, leaving an opening high enough to admit the flattened boxes 26, one at a time. When the cam 40 has moved the arm 35 to its forward position, a spring 42 attached between the frame 20 and the guide 33 returns the fingers 32 to their rearmost position.

As the box 26 is moved forwardly under the upright 30, it passes onto a rubber feed roller 43. The rubber feed roller 43 is positioned at the front of and somewhat below the guide 29. The feed roller 43 is mounted on a transverse shaft 44 which is journalled in bearings 45, mounted on the main frame 20. Also mounted on the shaft 44 is a sprocket wheel 46. A chain 47 connects the sprocket wheel 46 to a second sprocket 48 which is fixed to the main operating shaft 38. An electric motor 49, mounted on the frame 20, has a pulley 50 thereon which is drivingly connected by a belt 51 to an input pulley 52 of a speed reducing gear box 53. An output sprocket 54 of the gear box 53 is connected by a chain 55 to a drive sprocket 56 fixed to the operating shaft 38. Through the pulleys 50 and 52, the gear box 53, and the sprockets 54 and 46, the motor 49 rotates the operating shaft 38 in the direction indicated in the figures. The sprocket 46 on the shaft 44 drives the sprocket 48 on the shaft 38, causing the rubber feed roller 43 to rotate so that it will move the box 26 out of the rack 25. A second roller 57, positioned above the roller 43, assists in moving the flattened box 26 from the rack 25. As the box 26 is moved forward under the upright 30, it passes onto the feed roller 43 and under the roller 57. The roller 57 rides over the top side of the box 26 and presses it into firm engagement with the rubber feed roller 43 so that no slippage can occur.

The roller 57 is supported by two vertical bolts 58 and 59 which have bearings at their lower ends to support the roller 57. The bolts 58 and 59 extend through a mounting plate 60 and are adjustably secured thereto by nuts 61 and 62. The mounting plate has upstanding ears 63 thereon which seat adjacent cooperating ears 64 mounted on the upright 30. Two pins 65 and 66 extend through the ears 63 and 64 and rigidly secure the mounting plate 60 to the upright 30. With this construction, the roller 57 may easily and quickly be pivoted up away from the feed roller 43 in the event that a box 26 has become lodged in the mechanism and fails to feed properly. All that is necessary is to remove the pin 65 and pivot the mounting plate 60 and roller 57 up about the second pin 66. In this manner, the roller 57 may be removed from proximity of the feed roller 43 without interfering with the spacing adjustment thereof.

The boxes 26 are rectangular in shape and are comprised of two long sides 67 and 68 and two short sides 69 and 70. Each of the sides 67, 68, 69 and 70, has a top flap 71 thereon which, when the box is filled, may be folded down to close the top of the box. The long sides 67 and 68 have bottom flaps 72 and 73 thereon, and the short sides 69 and 70 have bottom flaps 74 and 75 thereon. When the box is closed, the short flaps 74 and 75 are folded in first and become the inside flaps. The long flaps 72 and 73 are folded in next and become the outside flaps. Hereinafter, the flaps 74 and 75 will be referred to as the inside flaps 74 and 75 and the flaps 72 and 73 will be referred to as the outside flaps 72 and 73. It will be understood, of course, that the invention is not limited to folding the shorter bottom flaps inwardly first, and the longer bottom flaps last, and if desired, the boxes may be arranged so that the longer bottom flaps are positioned on vertical side walls and the shorter flaps are positioned on horizontal side walls of the opened box. In this event the longer flaps will be folded in first, and the shorter flaps last, the longer flaps thus becoming the inside flaps and the shorter flaps becoming the outside flaps. The terms "inside flaps" and "outside flaps" are intended only to define the flaps folded in first and those folded in last, respectively, and have no reference to the dimensions of the flaps.

The flattened box 26 is delivered by the feed roller 43 onto a plate 76 which is supported on the frame 20 in front of the rack 25. The sides 68 and 69 of the box 26 lie on the plate 76 and the sides 67 and 69 face upward as shown in Figures 4 and 5. A guide member 77 is supported on the frame 20 beside the plate 76, and receives the top flaps 71 to assist the plate 76 in guiding and supporting the flattened box 26 as it is passed from the feed roller 43.

It is necessary to the operation of the machine that the flattened box 26 be positioned in the correct place on the plate 76 when the opening apparatus begins to operate. In order to accomplish this, a positioning finger 78 is included. The positioning finger 78 is pivoted to a bracket 79 on the frame 20 a short distance in front of the feed roller shaft 44. An actuating arm 80 is pivoted to the positioning finger 78 and extends forwardly to the main operating shaft 38. A slotted guide member 81, attached to the end of the arm 80, receives the shaft 38 and supports the end of the arm 80 thereon. A positioning cam 82 is fixed on the main operating shaft adjacent the guide member 81 and a cam follower 83 on the guide member 81 rides on the cam 82 and actuates the finger 78. The positioning finger 78 rests normally in a horizontal position. However, the cam 82 is so shaped that immediately after a flattened box has been passed over the feed roller 43 and is resting on the plate 76, the cam 82 causes the positioning finger 78 to raise to the position in Figure 5. As the finger 78 raises, it contacts the rear edge of the flattened box 26 and pushes the box 26 forward. A stop 84 on the main frame 20 (see Figure 4) is contacted by the ends of the bottom flaps 73 and 75 when the box is in the correct position. The cam 82 then allows the finger 78 to fall back to the position shown in Figure 6.

After the finger 78 has located the box 26 in the correct position, the long side 68 which rests upon the plate 76 is grasped and held firm by three suction cups 85 which are set into the plate 76. The suction cups 85 are connected by a vacuum line 86 (shown in Figures 2 and 8). The vacuum line 86 is connected to a release valve 87. A vacuum supply line 88 extends from the valve 87 to a vacuum pump 89 mounted on the frame 20 which supplies the vacuum for the suction cups 85. The release valve 87 has an opening 90 therein which will allow air to enter the line 88 and will render the suction cups 85 inoperative. An arm 91 is pivoted to the frame 20 near the valve 87 and carries at its upper end a metal disk 92. A rubber washer 93 is secured to the face of the disk 92 and is adapted to cover and seal the opening 90 when the arm 91 is pivoted toward the valve 87. The arm 91 has a portion 94 thereon extending downwardly below the pivot point. The portion 94 has at its free end a pin 95 which rides on a valve control cam 96 fixed to the shaft 38. The valve control cam 96 is so shaped that after the box has been positioned by the finger 78, the cam 96 will cause the arm 91 to pivot toward the valve 87 and bring the washer 93 into engagement with the opening 90. This action will seal the opening 90 and cause a vacuum to form in the line 86 to the suction cups 85. The cups 85 will then grip the long side 68 of the box 26, holding it in place.

Mounted on the frame 20 adjacent the top flap guide member 77 is an upstanding ear 97. The ear 97 has a pair of vertically spaced pivot pins 98 and 99 thereon which pivotally connect two arms 100 and 101. The arms 100 and 101 are pivotally connected to each other at their free ends by a link 102. The link 102 is of equal length to the distance between the pins 98 and 99 so that the ear 97, the arms 100 and 101, and the link 102 form a parallelogram. A transverse pipe 103 is fixed to the link 102 and extends over the plate 76 whereon the flattened box 26 rests. Downwardly facing suction cups 104 are attached to the pipe 103. A vacuum line 105 connects the cups 104 to the valve 87 in parallel with the stationary cups 85. An actuating arm 106 is pivoted to the arm 101 of the parallelogram and extends downwardly to the operating shaft 38. The arm 106 has at its end a slotted guide member 107 which receives the shaft 38. A box opening cam 108 is fixed to the shaft 38 adjacent the guide 107. A cam follower 107a is fixed to the guide 107 and rides on the cam 108 as shown in Figure 8. The cam 108 causes the arms 100 and 101 to swing down toward the frame 20 just as the valve 87 is closed and the flattened box is secured by the suction cups 85. When the arms 100 and 101 swing down, the link 102 is maintained in a vertical position since it forms one leg of a parallelogram and its opposite leg, the ear 97, is fixed in a vertical position. The suction cups 104 attached to the pipe 103 are always maintained with suction edges facing straight down by the link 102. Moving the arms 100 and 101 down brings the cups 104 against the flattened box 26. The suction cups 104 strike and grasp the box 26 on the top side 67 while the bottom side 68 is held by the stationary suction cups 85. The cam 108 then causes the arms 100 and 101 to rise, lifting the side 67 of the box away from the side 68, until the four sides of the box 26 are at right angles. The arms 100 and 101 then stop and hold the box in this position until the bottom flaps 72, 73, 74 and 75 have been closed.

The flap closing apparatus of the machine is located on the side of the frame 20 opposite the box opening mechanism just described. Figure 4 and Figures 12 through 17 best show the construction and and operation of the flap closing mechanism. The inside flaps 74 and 75, which are attached to the vertical sides of the opened box, are closed first. The inside flap closing mechanism comprises two vertical shafts 109 and 110 which are rotatably supported on the main frame 20 adjacent the bottom flaps of the opened box as shown in Figure 12. A secondary frame 111 supports the upper ends of the shafts 109 and 110. The shafts 109 and 110 carry horizontally extending flap closing arms 112 and 113. The arms 112 and 113 are curved outwardly at their outer ends, and each has a small vertical plate 114 fixed at its outer end. The arms 112 and 113 extend outwardly in opposite directions while the box opening mechanism is operating, so that they do not interfere with that operation. At the tops of the shafts, horizontally extending levers 115 and 116 are fixed. The levers 115 and 116 are connected by a tie rod 117 as shown in Figure 3. The levers are so arranged that rotation of the shaft 109 will cause the lever 115 to move the lever 116 and cause the shaft 110 to rotate in the opposite direction, thus swinging the flap folding arms 112 and 113 together. The shaft 109 extends down beyond the lower end of the shaft 110 toward the main operating shaft 38. At the lower end of the shaft 109 a lever 118 is fixed. The lever 118 extends inwardly toward the center of the machine and has a small roller 119 journalled at its free end. An inside flap folding cam 120 is fixed to the operating shaft 38 near the lever 118. The cam 120 has a portion 121 thereon of larger diameter than the remainder. The portion 121 has the leading and trailing edges 122 and 123 of its face bent away from the lever 118. The cam 120 is so positioned that as it rotates with the main operating shaft, the bent edge 122 contacts the roller 119 and swings the lever 118 out. This motion causes the shaft 109 to pivot and swing the arm 112 in against the inside flap 74. Due to the action of the levers 115 and 116 and the tie rod 117, the shaft 110 is also rotated and swings the arm 113 in against the inside flap 75. Figures 13 and 14 illustrate the action just described and show how the arms 112 and 113 fold in the inside flaps 74 and 75. The arms 112 and 113 stop when their outer ends are so positioned that the plates 114 thereon are resting just inside the fold line between the inside flaps 74 and 75 and the short sides 69 and 70 of the box 26. The arms 112 and 113 are maintained in this position during the time the roller 119 is in contact with the surface 121 of the cam 120.

Figure 15:
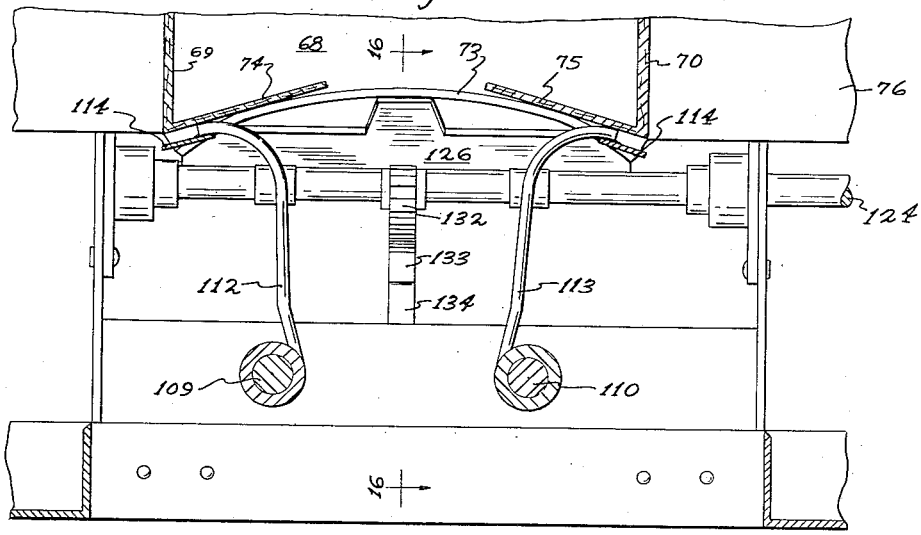
Figure 16:
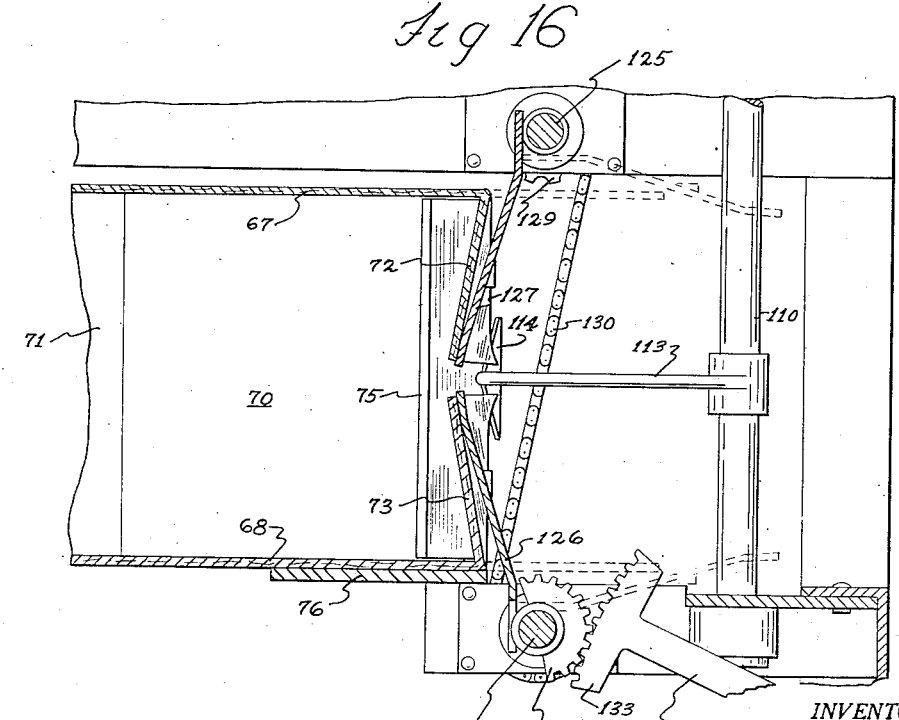

Immediately after the inside flaps 74 and 75 are folded into the bottom opening of the box 26, the outside flaps 72 and 73 are folded in. The mechanism that accomplishes this comprises two horizontal shafts 124 and 125, the shaft 124 being rotatably supported on the frame 20 beneath the lower outside flap 73 of the box 26 and the shaft 125 being rotatably supported by the secondary frame 111 above the upper outside flap 72 of the box 26. The shafts 124 and 125 have fixed thereto flap folding plates or wings 126 and 127. The wing 126 normally lies in the plane of the supporting guide 76 and the wing 127 normally lies in a parallel plane above the wing 126. When the box 26 is opened, the outside flaps 72 and 73 are positioned so that they rest against the wings 126 and 127. The shafts 124 and 125 have sprockets 128 and 129 fixed thereto at their free ends. A chain 130, having one end attached to the lower sprocket 128 is wound partially around that sprocket 128 and then wound partially around the upper sprocket 129 in the opposite direction, and has that end attached to the sprocket 129. With this construction, rotation of the shaft 124 in a direction to wind the chain 130 on the sprocket 128 causes the sprocket 129 to rotate the shaft 125 in the opposite direction. This action causes the wings 126 and 127 to pivot downwardly and fold in the outside flaps 72 and 73. The shaft 124 has a pinion segment 132 fixed thereto adjacent the wing 126 as shown in Figures 15 and 16. A rack 133, fixed at the end of a lever 134 is in engagement with the pinion segment 132. The lever 134 extends transversely of the frame 20 and is pivoted thereto near its center by a pin 135. The outer end of the lever 134 is pivoted to an actuating arm 136. The arm 136 has a slotted guide member 137 thereon which receives the main operating shaft 38. An outside flap closing cam 138 is fixed to the shaft 38 adjacent the guide member 137. A cam follower 139 on the guide member 137 rides on the cam 138 and actuates the arm 136. The upper end of the arm 136 is connected to a spring 140 which is suspended from a hanger 141 on the frame 20. The spring 140 forces the arm 136 upward and keeps the follower 139 in contact with the cam 138. The cam 138 is so shaped that after the inside flap arms 112 and 113 have moved in and closed the inside flaps 74 and 75, it causes the arm 136 to move downward, pivoting the lever 134 so that the rack 133 moves upward and drives the pinion segment 132 to rotate the shaft 124 and the wing 126 up against the flap 73. The sprockets 128 and 129 and the chain 130 cause the wing 127 to be moved downward at the same time, closing the flap 72.

In order to insure that the bottom flaps 72—75 will remain folded in when the box is ejected from the machine, it is necessary to fold them in far enough to "break" the fold lines between the flaps and the sides of the box 26. This action produces a permanent set in the material of the box 26 at the fold lines which will keep the flaps substantially closed when the arms 112 and 113 and the wings 126 and 127 are pivoted away. In order to produce this set, the wings 126 and 127 fold the outside flaps 72 and 73 into the box 26 beyond the closed position. However, in folding flaps 72 and 73 into the box 26 beyond the closed position, difficulty is encountered in that the corners of the outer flaps 72 and 73 often wedge and stick against the inside flaps 74 and 75, so that they do not return to the closed position. In the present invention this difficulty is overcome by bending the outer corners of the flaps 72 and 73 outward as the flaps are closed, so that these outer corners cannot wedge and stick when the flaps 72 and 73 are bent into the box to break the fold lines. Figures 15 and 16 best show this action. As the outside flaps 72 and 73 are folded to the closed position, they contact at each corner, the plates 114 fixed to the ends of the arms 112 and 113. The corners of the flaps 72 and 73 are stopped by these plates, while the wings 126 and 127 continue to fold the flaps 72 and 73 inward. When the flaps 72 and 73 have been folded a short distance into the box 26 enough force is exerted to cause the outer corners to fold out and pass by the plates 114. Then when the flaps are folded into their innermost position, these corners are folded back so that they cannot wedge against the inside flaps 74 and 75.

When the arms 112 and 113 and the wings 126 and 127 have folded the flaps 72—75 into the box, the outside flap folding cam causes the arm 136 to actuate the rack 133 to pivot the shaft 124 in the opposite direction, moving the wing 126 away from the flap 73. A spring 125a interposed on the shaft 125 between the frame 111 and the sprocket 129, causes this shaft to move the wing 127 away from the flap 72 and into its normal horizontal position.

The inside flap folding cam 120, however, holds the arms 112 and 113 in against the flaps 74 and 75 until the box is ejected from the machine, so that these arms may act as guides to assist in the ejection of the box.

As soon as the wings 126 and 127 have returned to their horizontal position, the release valve operating cam 96 operates to open the valve 87 and break the suction of the cups 85 and 104 so that the box 26 is free to move out. A lever 142 fixed radially to a collar 143 on the main operating shaft 38 swings up and contacts the box 26, forcing it to slide along the plate 76 to the delivery end of the machine.

As the box 26 begins to move, the bent trailing edge 123 of the inside flap closing cam 120 moves past the lever 118, and a spring 118a, interposed on the shaft 109 between the frame 20 and the lever 118, causes the shaft to pivot and swing the arms 112 and 113 out from the box 26.

In the event that the box 26 has become jammed or wedged in some way and will not move when the lever 142 contacts it, a safety device is included in the machine which will shut off the machine. The collar 143 which carries the lever 142 is mounted for free rotation on the shaft 38. A second collar 144, fixed to the shaft 38, is positioned beside the collar 143 so that their adjacent faces are touching. Each of the collars 143 and 144 has a semi-cylindrical groove in its adjacent face. A pin 145 is fixed in the groove in the face of the collar 144 and seats also in the groove of the collar 143. A spring 146 is positioned around the shaft 38 on the opposite side of the collar 143 from the collar 144 and is held in compression against the collar 143 by a washer 147 fixed on the shaft 38 (see Figure 9). With this construction, the spring 146 exerts sufficient force on the collar 143 to keep it against the collar 144, and the pin 145 seated in the groove in the collar 143 causes it to rotate with the shaft 38. However, if the lever 142 is restricted by a jammed box, the pin 145 will leave the groove in the collar 143 and force it out against the spring 146, thus allowing the collar 143 to stop while the shaft 38 continues to rotate. A micro switch 148 mounted on the frame 20 and electrically connected in the power input line to the motor 49, has an actuating lever 149 thereon which is positioned against the collar 143. When the pin 145 leaves the groove in the collar 143 and forces it out against the spring 146, the lever 149 is actuated and operates the micro switch 148 to stop the motor 49. This of course, stops the machinery so that the jammed box may be removed.

The operation of the machine is fully automatic. All that is necessary to operate the machine is to keep the rack 25 supplied with flattened boxes 26 and to clear the machine in the event that an imperfect box is admitted and jams the machinery. A box is admitted, set up, and ejected for each complete revolution of the shaft 38. Each of the operating cams are fixed to the shaft 38 so that there is no possibility of the components operating out of sequence. The box starting cam 40 operates the feed fingers 32 to move the flattened box onto the feed roller 43. The roller 43 delivers the box to the plate 76. Then the positioning cam 82 operates the finger 78 to position the flattened box 26 correctly for opening. The box opening cam 108 causes the suction cups 104 to be moved down to the side 67 of the box. At the same time the release valve control cam 96 closes the valve 87 and causes the cups 104 to grip the side 67 and also causes the stationary cups 85 to grip the opposite side 68 of the box 26. The box opening cam 108 then causes the cups 104 to rise and bring the box to the open position. Following this action, the inside flap folding cam 120 causes the arms 112 and 113 to fold in the inside flaps 74 and 75 in and hold them. The outside flap folding cam 138 causes the wings 126 and 127 to fold the outside flaps 72 and 73 into the box 26 and breaks the corners thereof past the plates 114 on the arms 112 and 113. The cam 138 then allows the wings 126 and 127 to pivot out again. The cam 96 opens the release valve 87 and releases the grip of the cups 85 and 104. The lever 142 contacts the box and ejects it while the cam 120 allows the arms 112 and 113 to move out from the box to their original position. As the lever 141 forces the box out, the cam 40 again causes the fingers 32 to start a new box 26 and the process is repeated.

It will be apparent from the foregoing that a box setting up machine constructed in accordance with this invention will operate quickly and efficiently to open flattened boxes, and fold the bottom flaps thereof into the bottom opening to close the same, in such a manner that these flaps will remain substantially in place until the box is loaded. While the knock-down boxes illustrated and described hereinbefore in connection with the invention are of the type having top flaps as well as bottom flaps, the top flaps are not manipulated in any manner whatsoever and are not necessary insofar as proper operation of the machine is concerned. The machine will open flattened boxes having no top flaps in exactly the same manner, and with identical results.

It is believed that the nature and advantages of my invention will appear clearly from the foregoing description.

Having thus described my invention, I claim:

1. In a device for setting up flattened cardboard boxes of the type wherein the four side walls are fixed together, and each side wall has a bottom flap thereon foldable inward to close the bottom opening between the walls, a main table frame, a platform mounted on said frame to support a flattened box thereon, stationary suction cups mounted on said platform positioned to grasp one side wall of the flattened box, lever means pivoted to said frame, said lever means supporting downwardly facing suction cups, power means connected to said lever means and operable to move the downwardly facing suction cups down against the side of the flattened box opposite the side grasped by said stationary suction cups and then to lift said opposite side whereby to open the box until the adjacent sides thereof are at right angles, a pair of vertical shafts rotatably mounted on said frame, said shafts carrying horizontal arms, power means connected to said shafts operable to rotate them and swing said horizontal arms inwardly toward each other whereby to engage and fold the bottom flaps on the vertical sides of the opened box into the opening between the sides, horizontal shafts rotatably mounted on said frame adjacent the upper and lower horizontal sides of the opened box, flap engaging members fixed to said horizontal shafts, and power means connected to said horizontal shafts operable to rotate the shafts and swing said flap engaging members toward each other whereby to fold the bottom flaps on the upper and lower horizontal sides of the opened box into the opening between the sides.

2. In a device for setting up flattened cardboard boxes of the type wherein the four side walls are fixed together and each side wall has a bottom flat thereon foldable inward to close the bottom opening between the walls, a main table frame, a platform mounted on said frame to support a flattened box thereon, stationary suction cups mounted on said platform and positioned to grasp one side wall of the flattened box, an upright ear fixed to said frame adjacent the platform, a pair of parallel lever arms pivoted to said upright ear one above the other, a connecting link pivoted between the said parallel levers at their free ends whereby to form a parallelogram, a horizontal pipe section fixed to said link and extending over the platform, downwardly facing suction cups mounted on said pipe section above the platform, power means connected to said parallel levers and operable to pivot them about the upstanding ear whereby to move said pipe section and the downwardly facing suction cups thereon down against the side of the flattened box opposite the side grasped by said stationary suction cups and then to move said pipe section and downwardly facing suction cups up to lift said opposite side of the box until the adjacent sides thereof are at right angles, a pair of vertical shafts rotatably mounted on said frame, said shafts carrying horizontal arms, power means connected to said shafts operable to rotate them and swing said horizontal arms inwardly toward each other whereby to engage and fold the bottom flaps on the vertical sides of the opened box into the opening between the sides, horizontal shafts rotatably mounted on said frame adjacent the upper and lower horizontal sides of the opened box, flap engaging members fixed to said horizontal shafts, and power means connected to said horizontal shafts operable to rotate the shafts and swing said flap engaging members toward each other whereby to fold the bottom flaps on the upper and lower horizontal sides of the opened box into the opening between the sides.

3. In a device for setting up flattened cardboard boxes of the type wherein the four side walls are fixed together, and each side wall has a bottom flap thereon foldable inward to close the bottom opening between the walls, a main table frame, a platform mounted on said frame to support a flattened box thereon, stationary suction cups mounted on said platform positioned to grasp one side wall of the flattened box, lever means pivoted to said frame, said lever means supporting downwardly facing suction cups, power means connected to said lever means and operable to move the downwardly facing suction cups down against the side of the flattened box opposite the side grasped by said stationary suction cups and then to lift said opposite side whereby to open the box until the adjacent sides thereof are at right angles, a pair of vertical shafts rotatably mounted on the frame adjacent the bottom flaps of the opened box, said shafts being drivingly connected together at their upper ends whereby rotation of one of said shafts will cause rotation of the other of said shafts in a reverse direction, horizontal curved flap folding arms fixed to said shafts intermediate their ends and extending in opposite directions, power means connected to one of said shafts operable to rotate the shafts and swing said flap folding arms toward each other whereby to engage and fold the bottom flaps on the vertical sides of the opened box into the opening between the sides, a pair of vertically spaced apart horizontal shafts rotatably mounted on said frame adjacent the upper and lower horizontal sides of the opened box, said horizontal shafts being drivingly connected together at one end thereof whereby rotation of one of said last named shafts will cause rotation of the other of said last named shafts in the opposite direction, flap engaging members fixed to said horizontal shafts and extending horizontally therefrom, and power means connected to one of said horizontal shafts operable to rotate the shafts and swing said flap engaging members toward each other whereby to engage and fold the bottom flaps on the upper and lower horizontal sides of the opened box into the opening between the sides.

4. In a device for setting up flattened cardboard boxes of the type wherein the four side walls are fixed together and each side wall has a bottom flap thereon foldable inward to close the bottom opening between the walls, a main table frame, a platform mounted on said frame to support a flattened box thereon, stationary suction cups mounted on said platform and positioned to grasp one side wall of the flattened box, an upright ear fixed to said frame adjacent the platform, a pair of parallel lever arms pivoted to said upright ear one above the other, a connecting link pivoted between said parallel levers at their free ends whereby to form a parallelogram, a horizontal pipe section fixed to said link and extending over the platform, downwardly facing suction cups mounted on said pipe section above the platform, power means connected to said parallel levers and operable to pivot them about the upstanding ear whereby to move said pipe section and the downwardly facing suction cups thereon down against the side of the flattened box opposite the side grasped by said stationary suction cups and then to move said pipe section and downwardly facing suction cups up to lift said opposite side of the box until the adjacent sides thereof are at right angles, a pair of vertical shafts rotatably mounted on the frame adjacent the bottom flaps of the opened box, said shafts being drivingly connected together at their upper ends whereby rotation of one of said shafts will cause rotation of the other of said shafts in a reverse direction, horizontal curved flap folding arms fixed to said shafts intermediate their ends and extending in opposite directions, power means connected to one of said shafts operable to rotate the shafts and swing said flap folding arms toward each other whereby to engage and fold the bottom flaps on the vertical sides of the opened box into the opening between the sides, a pair of vertically spaced apart horizontal shafts rotatably mounted on said frame adjacent the upper and lower horizontal sides of the opened box, said horizontal shafts being drivingly connected together at one end thereof whereby rotation of one of said last named shafts will cause rotation of the other of said last named shafts in the opposite direction, flap engaging members fixed to said horizontal shafts and extending horizontally therefrom, and power means connected to one of said horizontal shafts operable to rotate the shafts and swing said flap engaging members toward each other whereby to engage and fold the bottom flaps on the upper and lower horizontal sides of the opened box into the opening between the sides.

5. In a device for setting up flattened cardboard boxes of the type wherein the four side walls are fixed together and each side wall has a bottom flap thereon foldable inward to close the bottom opening between the walls, having a main supporting frame, a platform mounted on said frame, and having means thereon to secure an opened box in position on said platform with one side wall of the box resting on said platform, the improvement for closing the bottom flaps of the opened box comprising a pair of spaced apart horizontally extending flap folding arms pivoted on vertical axes to the main frame, power means connected to said arms operable to swing the arms toward each other to engage and fold the bottom flaps on the vertical sides of the opened box into the opening between the sides thereof and hold them in this position, a pair of vertically spaced apart flap engaging members pivoted to the frame on horizontal axes, said last named members being positioned adjacent the bottom flaps on the upper and lower horizontal sides of the opened box, and power means connected to said flap engaging members operable to pivot them toward each other to engage and fold the bottom flaps on the upper and lower horizontal sides into the opening between the sides, said horizontal flap folding arms having vertical triangular plates thereon, said plates being positioned adjacent the fold lines separating the vertical sides of the opened box from the bottom flaps thereon when the horizontal arms are held against the flaps, the flap engaging members forcing the upper and lower bottom flaps past said triangular plates whereby to bend the outer corners of said upper and lower flaps outwardly.

6. A method of setting up flattened cardboard boxes of the type wherein the four side walls are fixed together and each side wall has a bottom flap thereon foldable inward to close the bottom opening between the walls, two of said bottom flaps being foldable inwardly before the other two and being inside bottom flaps, the other two bottom flaps being outside bottom flaps, said method comprising grasping two opposite side walls of the flattened box, moving said opposite side walls apart until the adjacent walls of the box are at right angles to one another and holding the box in this position, folding the inside bottom flaps into the bottom opening of the box beyond their final closed position and holding said inside flaps folded into the opening, folding the outside bottom flaps into the bottom opening of the box beyond their normal closed position, and bending the outer corners of the outside flaps outwardly whereby to keep said corners from wedging against the inside bottom flaps of the box when the outside bottom flaps are folded into the opening.

References Cited in the file of this patent

UNITED STATES PATENTS

| | | |
|---|---|---|
| 1,289,673 | Cooper | Dec. 31, 1918 |
| 1,797,692 | Moritz | Mar. 24, 1931 |
| 2,249,201 | Ferguson | July 15, 1941 |
| 2,270,871 | Felber | Jan. 27, 1942 |
| 2,280,773 | Ferguson | Apr. 28, 1942 |
| 2,289,820 | Ardell | July 14, 1942 |